United States Patent
Chen et al.

(10) Patent No.: US 9,332,283 B2
(45) Date of Patent: May 3, 2016

(54) SIGNALING OF PREDICTION SIZE UNIT IN ACCORDANCE WITH VIDEO CODING

(75) Inventors: Peisong Chen, San Diego, CA (US); Brian Heng, Irvine, CA (US); Wade K. Wan, Orange, CA (US)

(73) Assignee: BROADCOM CORPORATION, Irvine, CA (US)

( * ) Notice: Subject to any disclaimer, the term of this patent is extended or adjusted under 35 U.S.C. 154(b) by 860 days.

(21) Appl. No.: 13/523,822

(22) Filed: Jun. 14, 2012

(65) Prior Publication Data

US 2013/0077684 A1  Mar. 28, 2013

Related U.S. Application Data

(60) Provisional application No. 61/539,948, filed on Sep. 27, 2011.

(51) Int. Cl.
| | |
|---|---|
| *H04N 7/12* | (2006.01) |
| *H04N 11/02* | (2006.01) |
| *H04N 11/04* | (2006.01) |
| *H04N 19/96* | (2014.01) |
| *H04N 19/503* | (2014.01) |

(Continued)

(52) U.S. Cl.
CPC ............ *H04N 19/96* (2014.11); *H04N 19/503* (2014.11); *H04N 19/70* (2014.11); *H04N 19/119* (2014.11); *H04N 19/174* (2014.11)

(58) Field of Classification Search
CPC . H04N 19/119; H04N 19/115; H04N 19/169; H04N 19/174; H04N 19/177; H04N 19/96
USPC ...................................... 375/240.01–240.29
See application file for complete search history.

(56) References Cited

U.S. PATENT DOCUMENTS

2004/0213469 A1* 10/2004 Apostolopoulos et al. ... 382/239
2005/0038837 A1   2/2005 Marpe et al.

(Continued)

OTHER PUBLICATIONS

Bross, et al.; WD4: Working Draft 4 of High-Efficiency Video Coding; Joint Colaborative Team on Video Coding (JCT-VC) of ITU-T SG16 WP3 and ISO/IEC JTC1/SC29/WG11; 6th Meeting: Torino, IT; Jul. 14-22, 2011; 216 pgs.

(Continued)

*Primary Examiner* — Andy Rao
*Assistant Examiner* — Jared Walker
(74) *Attorney, Agent, or Firm* — Garlick & Markison; Shayne X. Short

(57) ABSTRACT

Signaling of prediction size unit in accordance with video coding. In accordance with video coding, various binarization may be performed. In accordance with coding related to different types of slices (e.g., I, P, B slices), one or more binary trees may be employed for performing various respective operations (e.g., coding unit (CU) prediction and prediction unit (PU) partition mode operations). In one implementation, a common or singular binary tree is employed to encode jointly CU prediction and PU partition mode in a single syntax element for both P slices and B slices. That is to say, in such an implementation, instead of employing different respective binary trees for at least these different respective processes/operations, a common or single binary tree may be employed for them both. Appropriate coordination between and encoder/transmitter device and a decoder/receiver device may be performed to ensure appropriate handling of different respective phases of video coding.

20 Claims, 17 Drawing Sheets

(51) Int. Cl.
*H04N 19/70* (2014.01)
*H04N 19/174* (2014.01)
*H04N 19/119* (2014.01)

(56) References Cited

U.S. PATENT DOCUMENTS

2010/0086032 A1* 4/2010 Chen et al. ............... 375/240.12

2010/0098155 A1 4/2010 Demircin et al.
2011/0206123 A1* 8/2011 Panchal et al. ........... 375/240.15
2011/0228858 A1 9/2011 Budagavi et al.

OTHER PUBLICATIONS

European Patent Office; European Search Report; EP App No. 12005568.6; Dec. 17, 2012; 5 pgs.

* cited by examiner

SIGNALING OF PREDICTION SIZE UNIT IN ACCORDANCE WITH VIDEO CODING

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/539,948, entitled "Signaling of prediction size unit in accordance with video coding,", filed Sep. 27, 2011.

Incorporation by Reference

The following standards/draft standards are hereby incorporated herein by reference in their entirety and are made part of the present U.S. Utility Patent Application for all purposes:

1. "High efficiency video coding (HEVC) text specification draft 6," Joint Collaborative Team on Video Coding (JCT-VC) of ITU-T SG16 WP3 and ISO/IEC JTC1/SC29/WG11, 7th Meeting: Geneva, CH, 21-30 Nov. 2011, Document: JCTVC-H1003, 259 pages.

2. International Telecommunication Union, ITU-T, TELECOMMUNICATION STANDARDIZATION SECTOR OF ITU, H.264 (March 2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent.

BACKGROUND OF THE INVENTION

1. Technical Field of the Invention

The invention relates generally to digital video processing; and, more particularly, it relates to signaling in accordance with such digital video processing.

2. Description of Related Art

Communication systems that operate to communicate digital media (e.g., images, video, data, etc.) have been under continual development for many years. With respect to such communication systems employing some form of video data, a number of digital images are output or displayed at some frame rate (e.g., frames per second) to effectuate a video signal suitable for output and consumption. Within many such communication systems operating using video data, there can be a trade-off between throughput (e.g., number of image frames that may be transmitted from a first location to a second location) and video and/or image quality of the signal eventually to be output or displayed. The present art does not adequately or acceptably provide a means by which video data may be transmitted from a first location to a second location in accordance with providing an adequate or acceptable video and/or image quality, ensuring a relatively low amount of overhead associated with the communications, relatively low complexity of the communication devices at respective ends of communication links, etc.

DETAILED DESCRIPTION OF THE INVENTION

Figure 1:
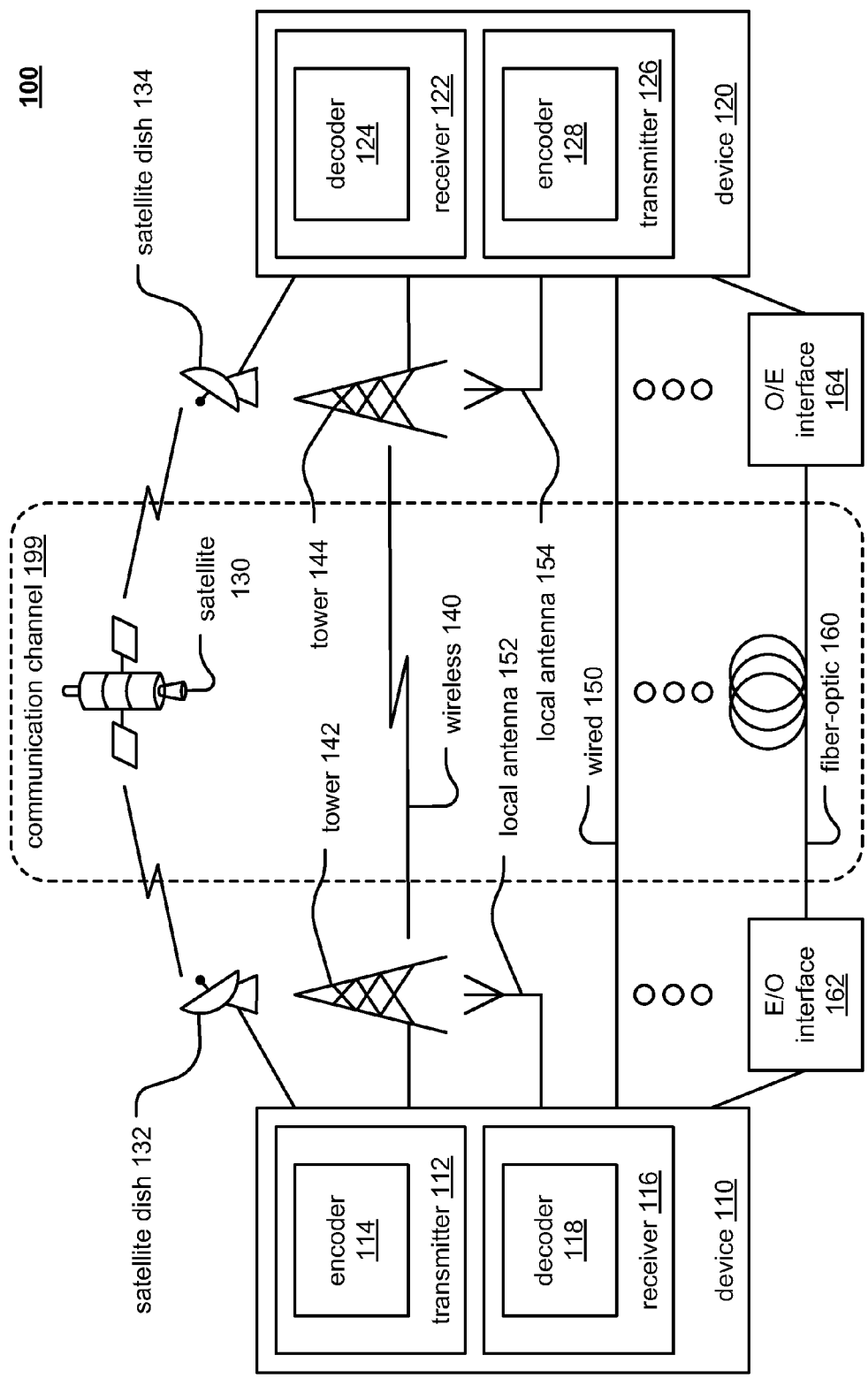
FIG. 1 and FIG. 2 illustrate various embodiments of communication systems.

Within many devices that use digital media such as digital video, respective images thereof, being digital in nature, are represented using pixels. Within certain communication systems, digital media can be transmitted from a first location to a second location at which such media can be output or displayed. The goal of digital communications systems, including those that operate to communicate digital video, is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and/or other types of media as well.

Figure 2:
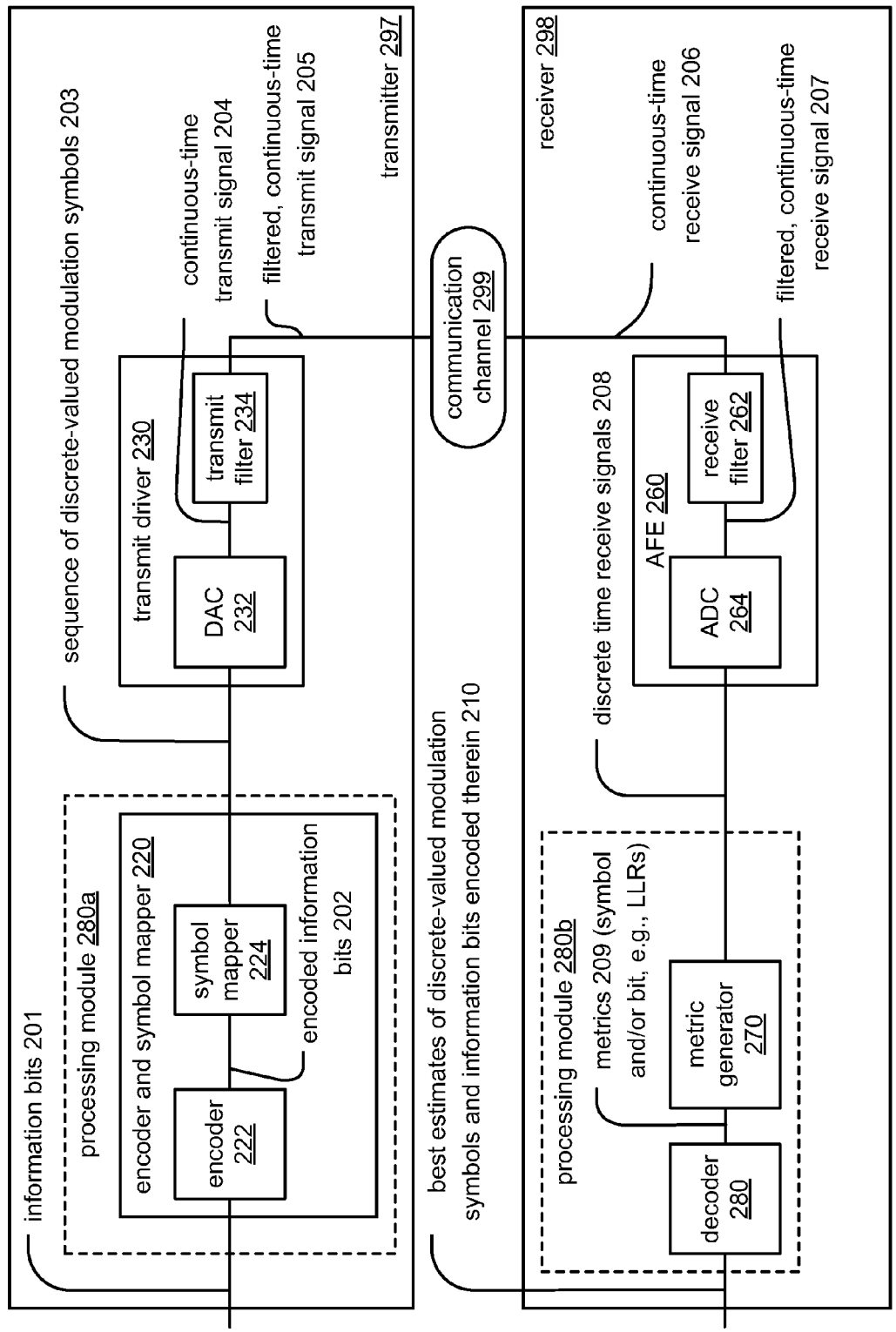

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Digital image and/or video processing of digital images and/or media (including the respective images within a digital video signal) may be performed by any of the various devices depicted below in FIG. 3A-3H to allow a user to view such digital images and/or video. These various devices do not include an exhaustive list of devices in which the image and/or video processing described herein may be effectuated, and it is noted that any generic digital image and/or video processing device may be implemented to perform the processing described herein without departing from the scope and spirit of the invention.

Figure 3:
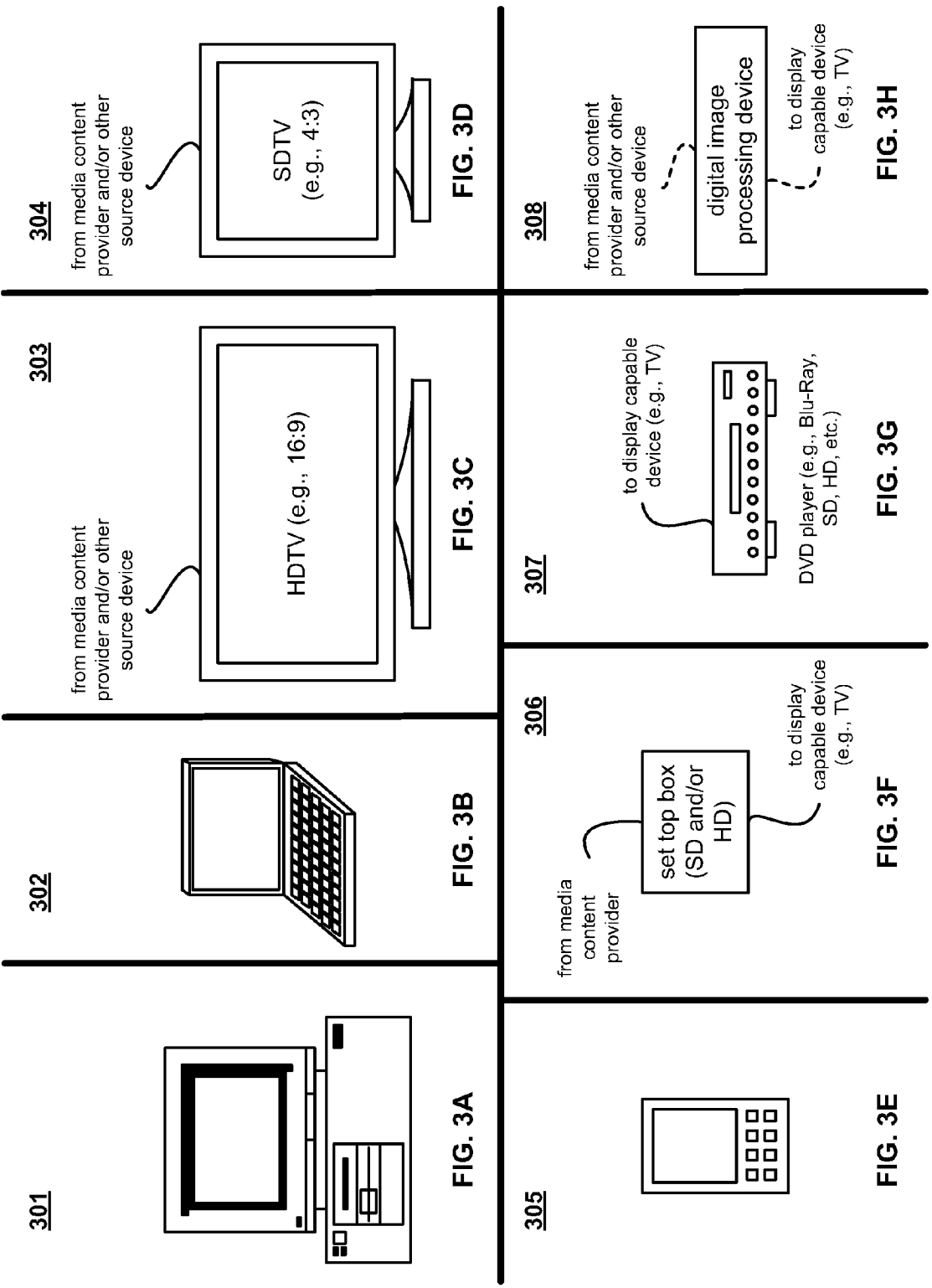
FIG. 3A illustrates an embodiment of a computer.
FIG. 3B illustrates an embodiment of a laptop computer.
FIG. 3C illustrates an embodiment of a high definition (HD) television.
FIG. 3D illustrates an embodiment of a standard definition (SD) television.
FIG. 3E illustrates an embodiment of a handheld media unit.
FIG. 3F illustrates an embodiment of a set top box (STB).
FIG. 3G illustrates an embodiment of a digital video disc (DVD) player.
FIG. 3H illustrates an embodiment of a generic digital image and/or video processing device.

FIG. 3A illustrates an embodiment of a computer 301. The computer 301 can be a desktop computer, or an enterprise storage devices such a server, of a host computer that is attached to a storage array such as a redundant array of independent disks (RAID) array, storage router, edge router, storage switch and/or storage director. A user is able to view still digital images and/or video (e.g., a sequence of digital images) using the computer 301. Oftentimes, various image and/or video viewing programs and/or media player programs are included on a computer 301 to allow a user to view such images (including video).

FIG. 3B illustrates an embodiment of a laptop computer 302. Such a laptop computer 302 may be found and used in any of a wide variety of contexts. In recent years, with the ever-increasing processing capability and functionality found within laptop computers, they are being employed in many instances where previously higher-end and more capable desktop computers would be used. As with the computer 301, the laptop computer 302 may include various image viewing programs and/or media player programs to allow a user to view such images (including video).

FIG. 3C illustrates an embodiment of a high definition (HD) television 303. Many HD televisions 303 include an integrated tuner to allow the receipt, processing, and decoding of media content (e.g., television broadcast signals) thereon. Alternatively, sometimes an HD television 303 receives media content from another source such as a digital video disc (DVD) player, set top box (STB) that receives, processes, and decodes a cable and/or satellite television broadcast signal. Regardless of the particular implementation, the HD television 303 may be implemented to perform image and/or video processing as described herein. Generally speaking, an HD television 303 has capability to display HD media content and oftentimes is implemented having a 16:9 widescreen aspect ratio.

FIG. 3D illustrates an embodiment of a standard definition (SD) television 304. Of course, an SD television 304 is somewhat analogous to an HD television 303, with at least one difference being that the SD television 304 does not include capability to display HD media content, and an SD television 304 oftentimes is implemented having a 4:3 full screen aspect ratio. Nonetheless, even an SD television 304 may be implemented to perform image and/or video processing as described herein.

FIG. 3E illustrates an embodiment of a handheld media unit 305. A handheld media unit 305 may operate to provide general storage or storage of image/video content information such as joint photographic experts group (JPEG) files, tagged image file format (TIFF), bitmap, motion picture experts group (MPEG) files, Windows Media (WMA/WMV) files, other types of video content such as MPEG4 files, etc. for playback to a user, and/or any other type of information that may be stored in a digital format. Historically, such handheld media units were primarily employed for storage and playback of audio media; however, such a handheld media unit 305 may be employed for storage and playback of virtual any media (e.g., audio media, video media, photographic media, etc.). Moreover, such a handheld media unit 305 may also include other functionality such as integrated communication circuitry for wired and wireless communications. Such a handheld media unit 305 may be implemented to perform image and/or video processing as described herein.

FIG. 3F illustrates an embodiment of a set top box (STB) 306. As mentioned above, sometimes a STB 306 may be implemented to receive, process, and decode a cable and/or satellite television broadcast signal to be provided to any appropriate display capable device such as SD television 304 and/or HD television 303. Such an STB 306 may operate independently or cooperatively with such a display capable device to perform image and/or video processing as described herein.

FIG. 3G illustrates an embodiment of a digital video disc (DVD) player 307. Such a DVD player may be a Blu-Ray DVD player, an HD capable DVD player, an SD capable DVD player, an up-sampling capable DVD player (e.g., from SD to HD, etc.) without departing from the scope and spirit of the invention. The DVD player may provide a signal to any appropriate display capable device such as SD television 304 and/or HD television 303. The DVD player 305 may be implemented to perform image and/or video processing as described herein.

FIG. 3H illustrates an embodiment of a generic digital image and/or video processing device 308. Again, as mentioned above, these various devices described above do not include an exhaustive list of devices in which the image and/or video processing described herein may be effectuated, and it is noted that any generic digital image and/or video processing device 308 may be implemented to perform the image and/or video processing described herein without departing from the scope and spirit of the invention.

Figure 4:
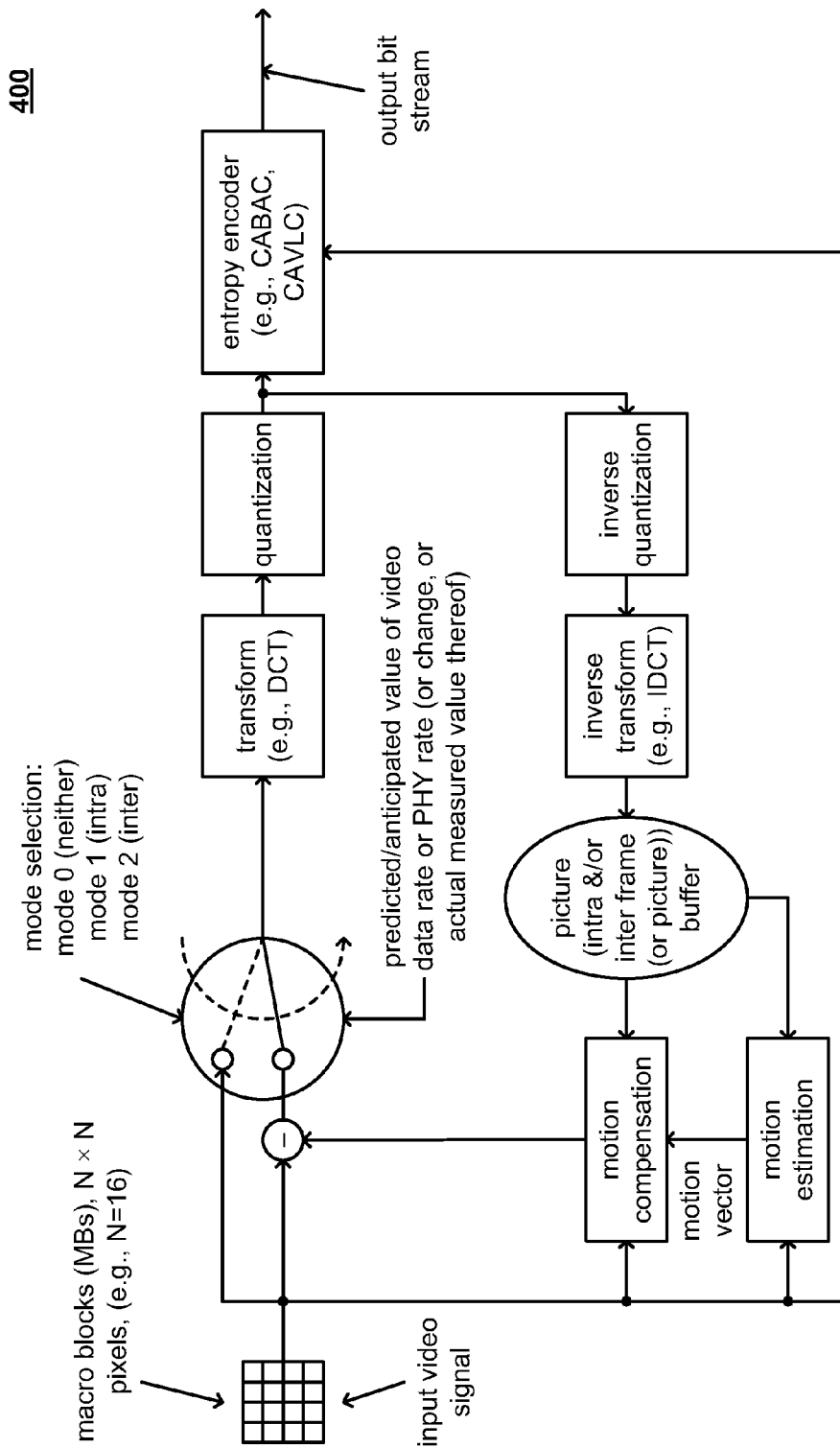
FIG. 4, FIG. 5, and FIG. 6 are diagrams illustrating various embodiments of video encoding architectures.
Figure 5:
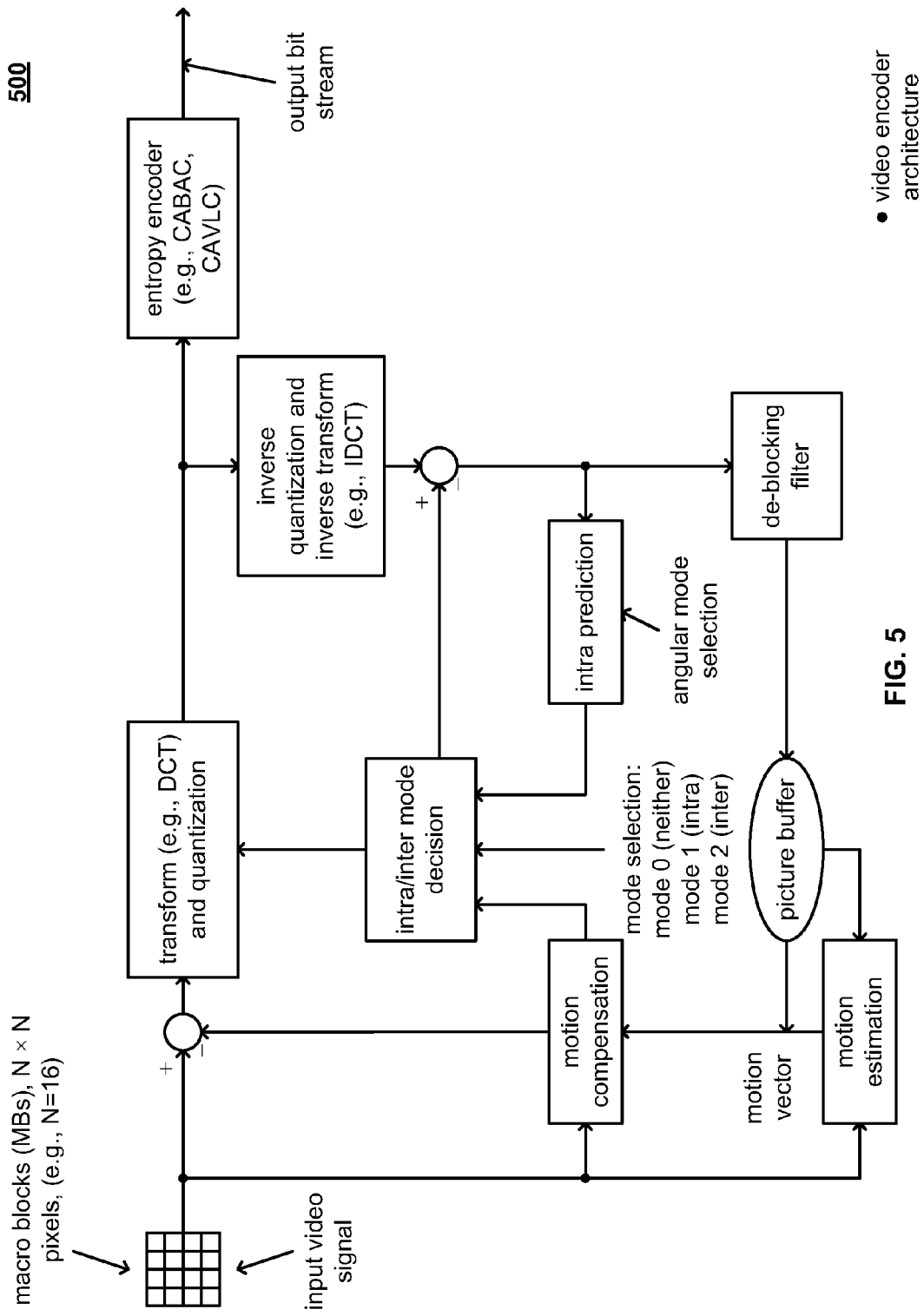
Figure 6:
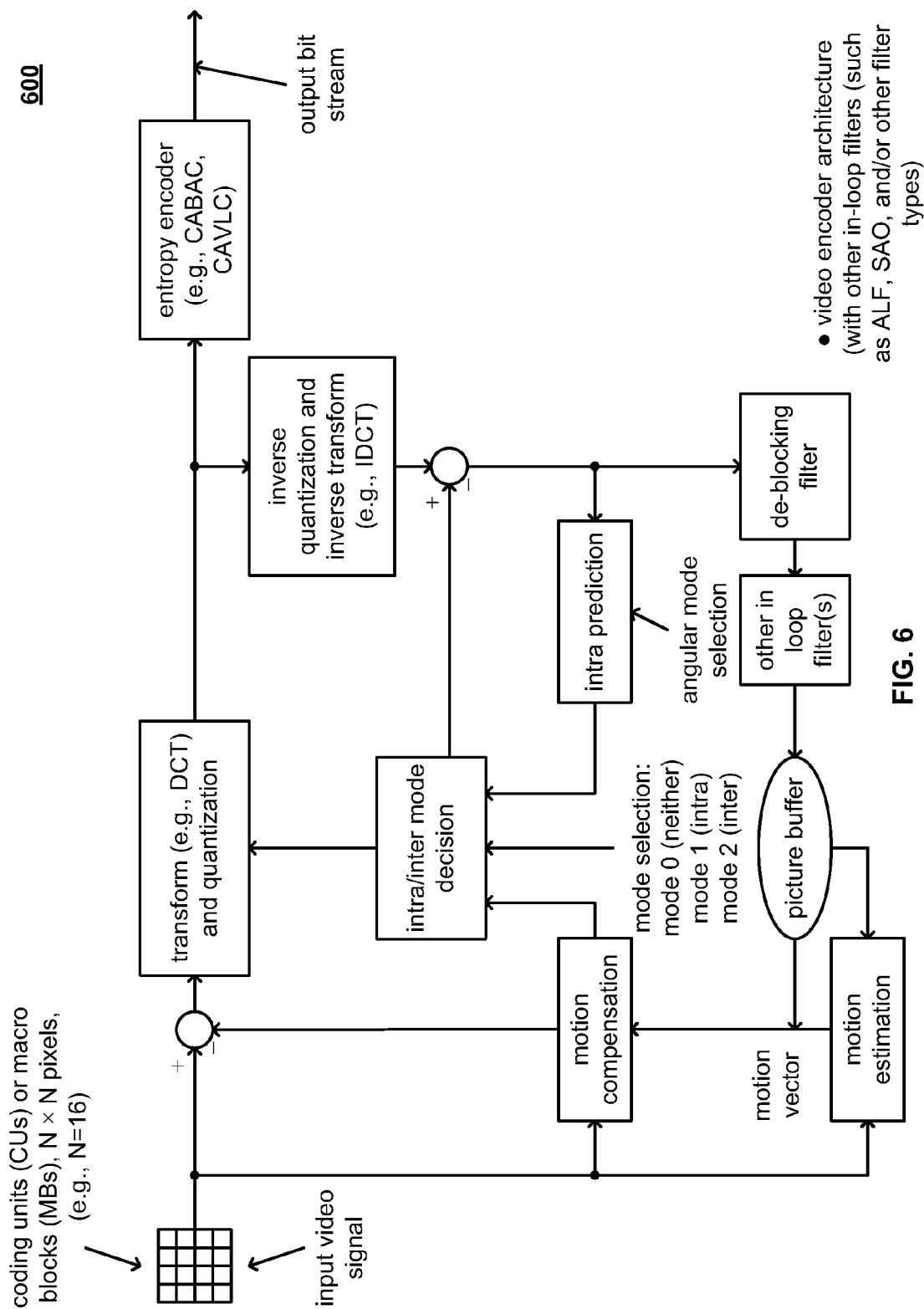

FIG. 4, FIG. 5, and FIG. 6 are diagrams illustrating various embodiments 400 and 500, and 600, respectively, of video encoding architectures.

Referring to embodiment 400 of FIG. 4, as may be seen with respect to this diagram, an input video signal is received by a video encoder. In certain embodiments, the input video signal is composed of coding units (CUs) or macro-blocks (MBs). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer. Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2, −3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

A picture buffer, alternatively referred to as a digital picture buffer or a DPB, receives the signal from the IDCT module; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 500 of FIG. 5, as may be seen with respect to this diagram, an input video signal is received by a video encoder. In certain embodiments, the input video signal is composed of coding units or macro-blocks (and/or may be partitioned into coding units (CUs)). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer. Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2, −3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

In certain optional embodiments, the output from the de-blocking filter is provided to one or more other in-loop filters (e.g., implemented in accordance with adaptive loop filter (ALF), sample adaptive offset (SAO) filter, and/or any other filter type) implemented to process the output from the inverse transform block.

For example, such an adaptive loop filter (ALF) may be implemented to process the output from the inverse transform block. Such an adaptive loop filter (ALF) is applied to the decoded picture before it is stored in a picture buffer (sometimes referred to as a DPB, digital picture buffer). The adaptive loop filter (ALF) is implemented to reduce coding noise of the decoded picture, and the filtering thereof may be selectively applied on a slice by slice basis, respectively, for luminance and chrominance whether or not the adaptive loop filter (ALF) is applied either at slice level or at block level. Two-dimensional 2-D finite impulse response (FIR) filtering may be used in application of the adaptive loop filter (ALF). The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment operates by generating the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an adaptive loop filter (ALF), there may be some increasing complexity within an encoder implemented within the transmitter communication device as well as within a decoder implemented within a receiver communication device.

With respect to one type of an in-loop filter, the use of an adaptive loop filter (ALF) can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with adaptive loop filter (ALF) processing.

Receiving the signal output from the ALF is a picture buffer, alternatively referred to as a digital picture buffer or a DPB; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 600 of FIG. 6, with respect to this diagram depicting an alternative embodiment of a video encoder, such a video encoder carries out prediction, transform, and encoding processes to produce a compressed output bit stream. Such a video encoder may operate in accordance with and be compliant with one or more video encoding protocols, standards, and/or recommended practices such as ISO/IEC 14496-10—MPEG-4 Part 10, AVC (Advanced Video Coding), alternatively referred to as H.264/MPEG-4 Part 10 or AVC (Advanced Video Coding), ITU H.264/MPEG4-AVC.

It is noted that a corresponding video decoder, such as located within a device at another end of a communication channel, is operative to perform the complementary processes of decoding, inverse transform, and reconstruction to produce a respective decoded video sequence that is (ideally) representative of the input video signal.

As may be seen with respect to this diagram, alternative arrangements and architectures may be employed for effectuating video encoding. Generally speaking, an encoder processes an input video signal (e.g., typically composed in units of coding units or macro-blocks, often times being square in shape and including N×N pixels therein). The video encoding determines a prediction of the current macro-block based on previously coded data. That previously coded data may come from the current frame (or picture) itself (e.g., such as in accordance with intra-prediction) or from one or more other frames (or pictures) that have already been coded (e.g., such as in accordance with inter-prediction). The video encoder subtracts the prediction of the current macro-block to form a residual.

Generally speaking, intra-prediction is operative to employ block sizes of one or more particular sizes (e.g., 16×16, 8×8, or 4×4) to predict a current macro-block from surrounding, previously coded pixels within the same frame (or picture). Generally speaking, inter-prediction is operative to employ a range of block sizes (e.g., 16×16 down to 4×4) to predict pixels in the current frame (or picture) from regions that are selected from within one or more previously coded frames (or pictures).

With respect to the transform and quantization operations, a block of residual samples may undergo transformation using a particular transform (e.g., 4×4 or 8×8). One possible embodiment of such a transform operates in accordance with discrete cosine transform (DCT). The transform operation outputs a group of coefficients such that each respective coefficient corresponds to a respective weighting value of one or more basis functions associated with a transform. After undergoing transformation, a block of transform coefficients is quantized (e.g., each respective coefficient may be divided by an integer value and any associated remainder may be discarded, or they may be multiplied by an integer value). The quantization process is generally inherently lossy, and it can reduce the precision of the transform coefficients according to a quantization parameter (QP). Typically, many of the coefficients associated with a given macro-block are zero, and only some nonzero coefficients remain. Generally, a relatively high QP setting is operative to result in a greater proportion of zero-valued coefficients and smaller magnitudes of non-zero coefficients, resulting in relatively high compression (e.g., relatively lower coded bit rate) at the expense of relatively poorly decoded image quality; a relatively low QP setting is operative to allow more nonzero coefficients to remain after quantization and larger magnitudes of non-zero coefficients, resulting in relatively lower compression (e.g., relatively higher coded bit rate) with relatively better decoded image quality.

The video encoding process produces a number of values that are encoded to form the compressed bit stream. Examples of such values include the quantized transform coefficients, information to be employed by a decoder to re-create the appropriate prediction, information regarding the structure of the compressed data and compression tools employed during encoding, information regarding a complete video sequence, etc. Such values and/or parameters (e.g., syntax elements) may undergo encoding within an entropy encoder operating in accordance with CABAC, CAVLC, or some other entropy coding scheme, to produce an output bit stream that may be stored, transmitted (e.g., after undergoing appropriate processing to generate a continuous time signal that comports with a communication channel), etc.

In an embodiment operating using a feedback path, the output of the transform and quantization undergoes inverse quantization and inverse transform. One or both of intra-prediction and inter-prediction may be performed in accordance with video encoding. Also, motion compensation and/or motion estimation may be performed in accordance with such video encoding.

The signal path output from the inverse quantization and inverse transform (e.g., IDCT) block, which is provided to the intra-prediction block, is also provided to a de-blocking filter. The output from the de-blocking filter is provided to one or more other in-loop filters (e.g., implemented in accordance with adaptive loop filter (ALF), sample adaptive offset (SAO) filter, and/or any other filter type) implemented to process the output from the inverse transform block. For example, in one possible embodiment, an ALF is applied to the decoded picture before it is stored in a picture buffer (again, sometimes alternatively referred to as a DPB, digital picture buffer). The ALF is implemented to reduce coding noise of the decoded picture, and the filtering thereof may be selectively applied on a slice by slice basis, respectively, for luminance and chrominance whether or not the ALF is applied either at slice level or at block level. Two-dimensional 2-D finite impulse response (FIR) filtering may be used in application of the ALF. The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment generated the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an ALF, there may be some increasing complexity within encoder implemented within the transmitter communication device as well as within a decoder implemented within a receiver communication device.

As mentioned with respect to other embodiments, the use of an ALF can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with ALF processing.

With respect to any video encoder architecture implemented to generate an output bitstream, it is noted that such architectures may be implemented within any of a variety of communication devices. The output bitstream may undergo additional processing including error correction code (ECC), forward error correction (FEC), etc. thereby generating a modified output bitstream having additional redundancy deal therein. Also, as may be understood with respect to such a digital signal, it may undergo any appropriate processing in accordance with generating a continuous time signal suitable for or appropriate for transmission via a communication channel That is to say, such a video encoder architecture may be implemented within a communication device operative to perform transmission of one or more signals via one or more communication channels. Additional processing may be made on an output bitstream generated by such a video encoder architecture thereby generating a continuous time signal that may be launched into a communication channel.

Figure 7:
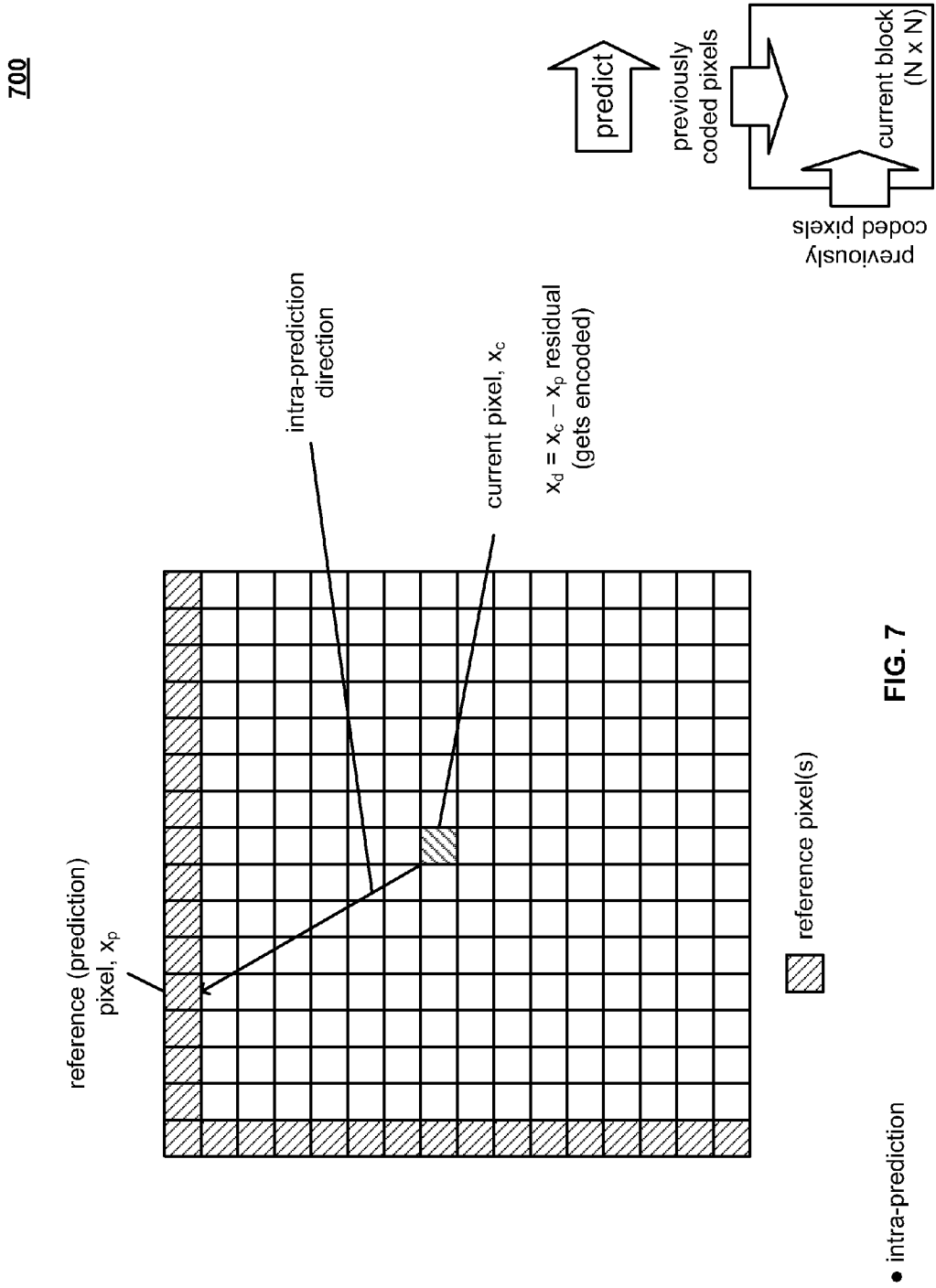
FIG. 7 is a diagram illustrating an embodiment of intra-prediction processing.

FIG. 7 is a diagram illustrating an embodiment 700 of intra-prediction processing. As can be seen with respect to this diagram, a current block of video data (e.g., often times being square in shape and including generally N×N pixels) undergoes processing to estimate the respective pixels therein. Previously coded pixels located above and to the left of the current block are employed in accordance with such intra-prediction. From certain perspectives, an intra-prediction direction may be viewed as corresponding to a vector extending from a current pixel to a reference pixel located above or to the left of the current pixel. Details of intra-prediction as applied to coding in accordance with H.264/AVC are specified within the corresponding standard (e.g., International Telecommunication Union, ITU-T, TELECOMMUNICATION STANDARDIZATION SECTOR OF ITU, H.264 (March 2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent) that is incorporated by reference above.

The residual, which is the difference between the current pixel and the reference or prediction pixel, is that which gets encoded. As can be seen with respect to this diagram, intra-prediction operates using pixels within a common frame (or picture). It is of course noted that a given pixel may have different respective components associated therewith, and there may be different respective sets of samples for each respective component.

Figure 8:
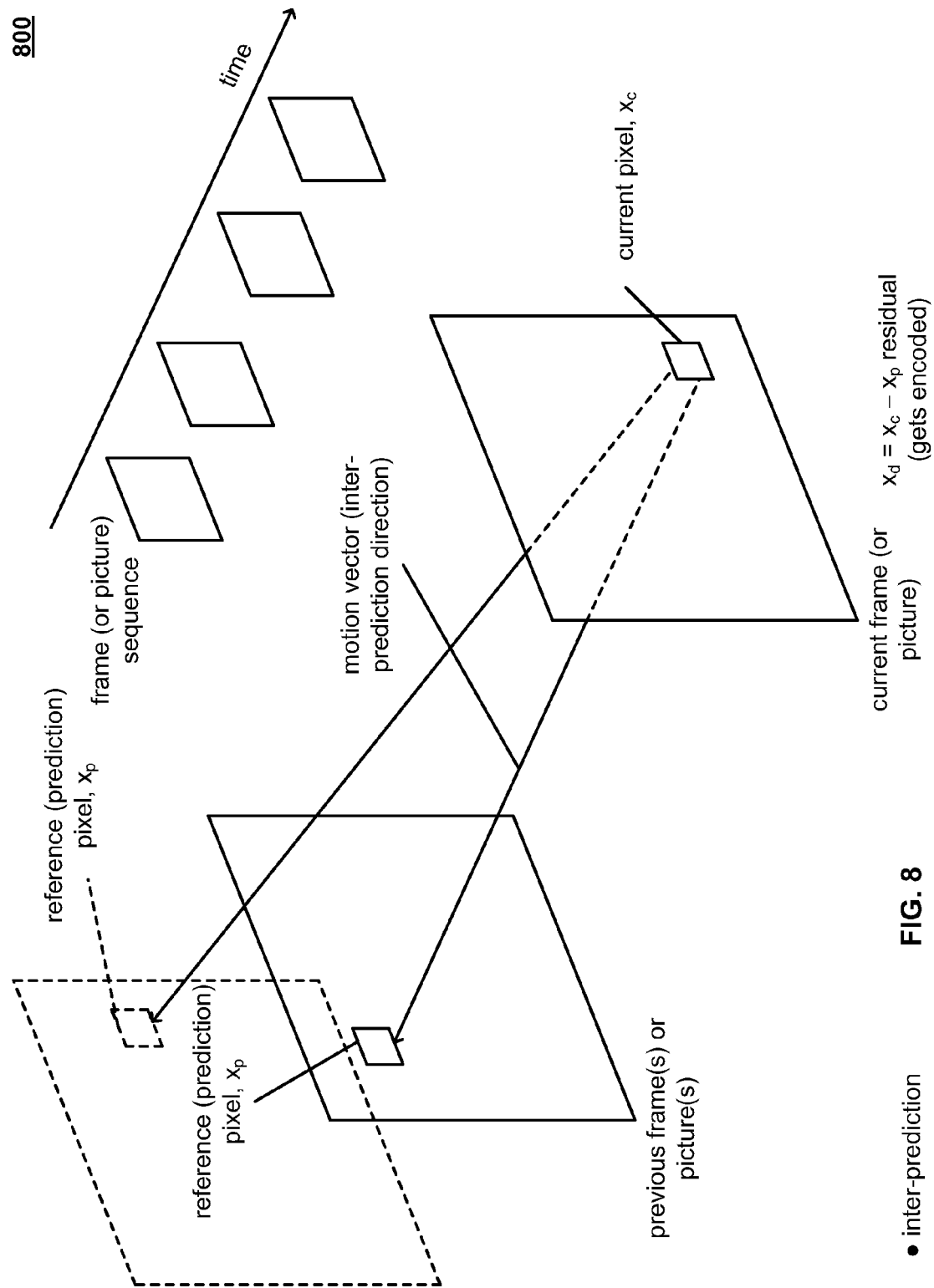
FIG. 8 is a diagram illustrating an embodiment of inter-prediction processing.

FIG. 8 is a diagram illustrating an embodiment 800 of inter-prediction processing. In contradistinction to intra-prediction, inter-prediction is operative to identify a motion vector (e.g., an inter-prediction direction) based on a current set of pixels within a current frame (or picture) and one or more sets of reference or prediction pixels located within one or more other frames (or pictures) within a frame (or picture) sequence. As can be seen, the motion vector extends from the current frame (or picture) to another frame (or picture) within the frame (or picture) sequence. Inter-prediction may utilize sub-pixel interpolation, such that a prediction pixel value corresponds to a function of a plurality of pixels in a reference frame or picture.

A residual may be calculated in accordance with inter-prediction processing, though such a residual is different from the residual calculated in accordance with intra-prediction processing. In accordance with inter-prediction processing, the residual at each pixel again corresponds to the difference between a current pixel and a predicted pixel value. However, in accordance with inter-prediction processing, the current pixel and the reference or prediction pixel are not located within the same frame (or picture). While this diagram shows inter-prediction as being employed with respect to one or more previous frames or pictures, it is also noted that alternative embodiments may operate using references corresponding to frames before and/or after a current frame. For example, in accordance with appropriate buffering and/or memory management, a number of frames may be stored. When operating on a given frame, references may be generated from other frames that precede and/or follow that given frame.

Coupled with the CU, a basic unit may be employed for the prediction partition mode, namely, the prediction unit, or PU. It is also noted that the PU is defined only for the last depth CU, and its respective size is limited to that of the CU.

Figure 9:
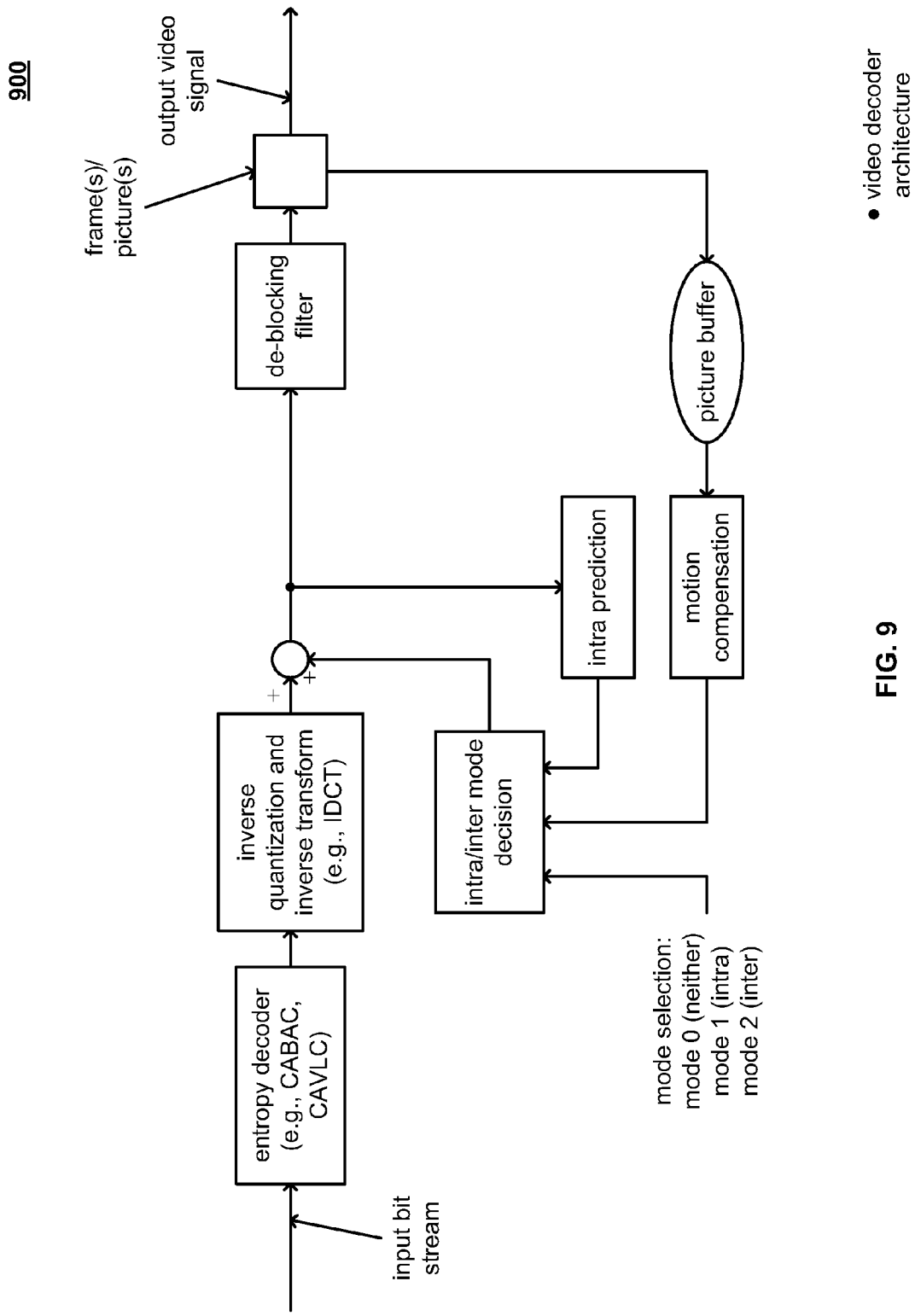
FIG. 9 and FIG. 10 are diagrams illustrating various embodiments of video decoding architectures.
Figure 10:
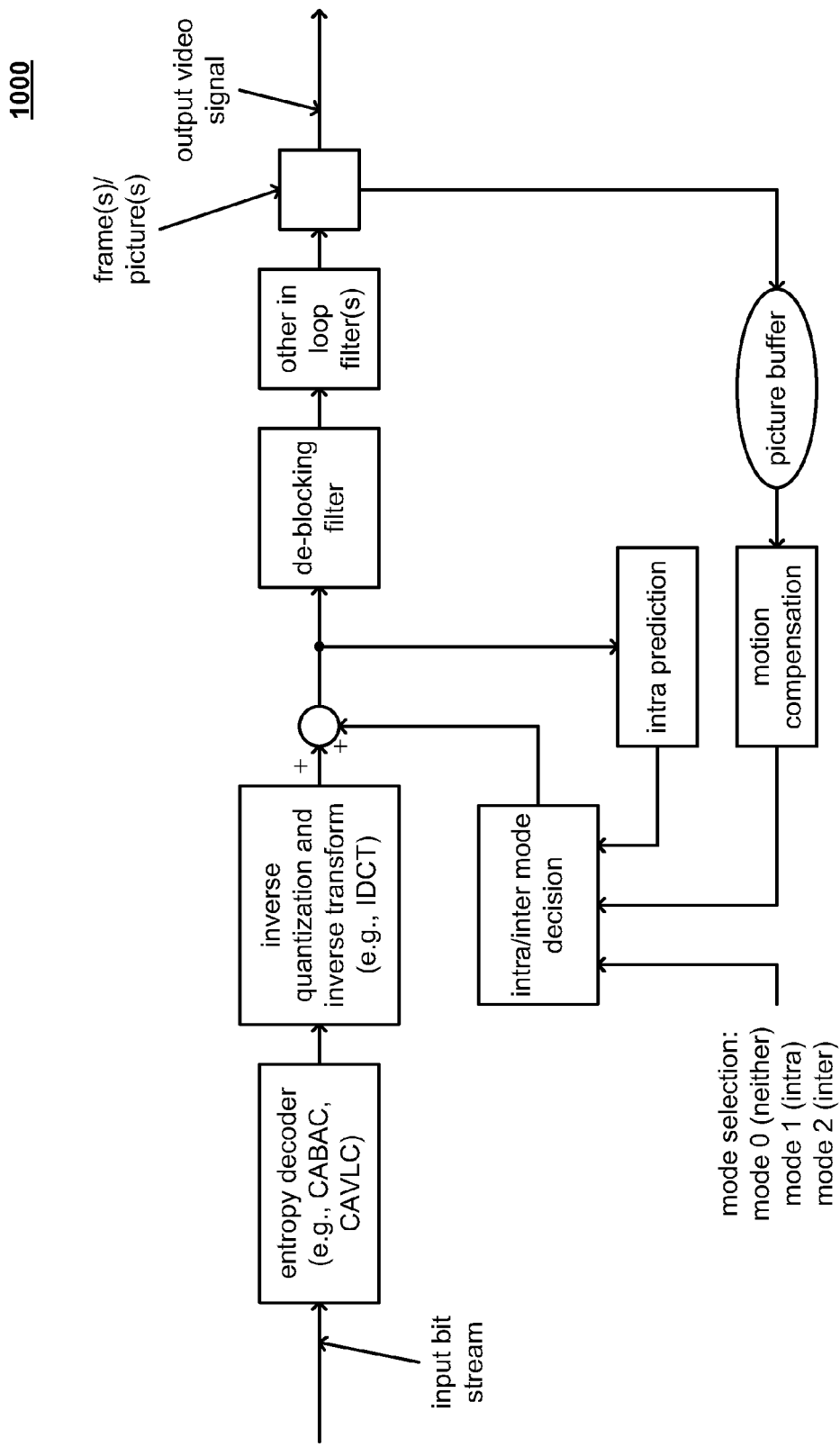

FIG. 9 and FIG. 10 are diagrams illustrating various embodiments 900 and 1000, respectively, of video decoding architectures.

Generally speaking, such video decoding architectures operate on an input bitstream. It is of course noted that such an input bitstream may be generated from a signal that is received by a communication device from a communication channel. Various operations may be performed on a continuous time signal received from the communication channel, including digital sampling, demodulation, scaling, filtering, etc. such as may be appropriate in accordance with generating the input bitstream. Moreover, certain embodiments, in which one or more types of error correction code (ECC), forward error correction (FEC), etc. may be implemented, may perform appropriate decoding in accordance with such ECC, FEC, etc. thereby generating the input bitstream. That is to say, in certain embodiments in which additional redundancy may have been made in accordance with generating a corresponding output bitstream (e.g., such as may be launched from a transmitter communication device or from the transmitter portion of a transceiver communication device), appropriate processing may be performed in accordance with generating the input bitstream. Overall, such a video decoding architectures and lamented to process the input bitstream thereby generating an output video signal corresponding to the original input video signal, as closely as possible and perfectly in an ideal case, for use in being output to one or more video display capable devices.

Referring to the embodiment 900 of FIG. 9, generally speaking, a decoder such as an entropy decoder (e.g., which may be implemented in accordance with CABAC, CAVLC, etc.) processes the input bitstream in accordance with performing the complementary process of encoding as performed within a video encoder architecture. The input bitstream may be viewed as being, as closely as possible and perfectly in an ideal case, the compressed output bitstream generated by a video encoder architecture. Of course, in a real-life application, it is possible that some errors may have been incurred in a signal transmitted via one or more communication links. The entropy decoder processes the input bitstream and extracts the appropriate coefficients, such as the DCT coefficients (e.g., such as representing chroma, luma, etc. information) and provides such coefficients to an inverse quantization and inverse transform block. In the event that a DCT transform is employed, the inverse quantization and inverse transform block may be implemented to perform an inverse DCT (IDCT) operation. Subsequently, A/D blocking filter is implemented to generate the respective frames and/or pictures corresponding to an output video signal. These frames and/or pictures may be provided into a picture buffer, or a digital picture buffer (DPB) for use in performing other operations including motion compensation. Generally speaking, such motion compensation operations may be viewed as corresponding to inter-prediction associated with video encoding. Also, intra-prediction may also be performed on the signal output from the inverse quantization and inverse transform block. Analogously as with respect to video encoding, such a video decoder architecture may be implemented to perform mode selection between performing it neither intra-prediction nor inter-prediction, inter-prediction, or intra-prediction in accordance with decoding an input bitstream thereby generating an output video signal.

Referring to the embodiment 1000 of FIG. 10, in certain optional embodiments, one or more in-loop filters (e.g., implemented in accordance with adaptive loop filter (ALF), sample adaptive offset (SAO) filter, and/or any other filter type) such as may be implemented in accordance with video encoding as employed to generate an output bitstream, a corresponding one or more in-loop filters may be implemented within a video decoder architecture. In one embodiment, an appropriate implementation of one or more such in-loop filters is after the de-blocking filter.

Figure 11:
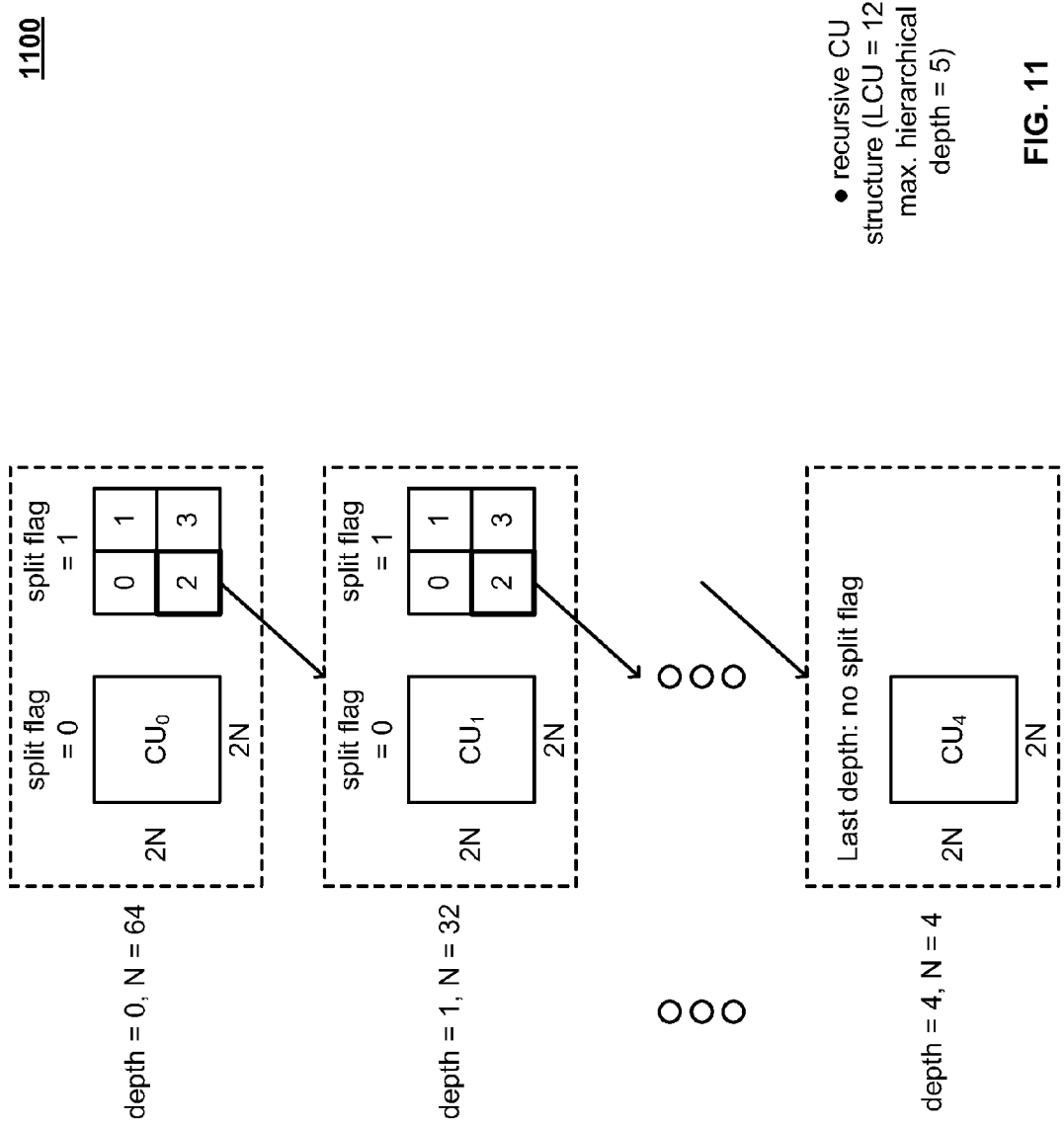
FIG. 11 illustrates an embodiment of recursive coding unit (CU) structure.

FIG. 11 illustrates an embodiment 1100 of recursive coding unit (CU) structure. High efficiency video coding (HEVC) is a next-generation video compression standard currently under development. In the opinion of some in the industry, the HEVC standard looks to be a successor to H.264/MPEG4-AVC (alternatively referred to as AVC), as referred to and also incorporated by reference above. In accordance with video coding in accordance with the currently developing HEVC standard operates using a coding unit, or CU, as a basic unit which typically has a square shape and whose counterpart in accordance with AVC is a macro block (MB). From certain perspectives, the CU has a similar operational purpose and role to the MB, and the corresponding sub macro block (SMB) in AVC. However, at least one difference between the two respective components employed in accordance with video coding is that a CU may have any one of a number of various sizes, with no particular distinction corresponding to its respective size. In accordance with video coding terminology performed in accordance with the currently developing HEVC standard, to particular terms are defined with respect to CU, namely, the largest coding unit (LCU) and the smallest content unit (SCU).

In accordance with video coding, a picture may be represented using a number of non-overlapped LCUs. Since the CU is assumed to be is restricted to be square in shape, the CU structure within an LCU can be expressed in a recursive tree representation as depicted within FIG. 11. That is to say, a CU may be characterized by a corresponding LCU size and the hierarchical depth in the LCU to which that LCU belongs.

Once the tree splitting process is done as detected within FIG. 11, different respective prediction encoding approaches are specified for every CU which is not further split. In other words, the CU hierarchical tree may be viewed as including a number of respective leaf nodes each corresponding to the respective tree splitting process as applied to the respective CU's corresponding to a picture. In accordance with video coding and specifically with respect to P and B slices, each respective CU may use either intra-prediction or inter-prediction in accordance with video encoding. For example, as is described in respect to the subsequent paragraphs and the respective FIG. 7 and FIG. 8, inter-prediction coding is operative to employ references from neighboring frames, while intra-prediction coding is operative to employ references from the spatial neighboring pixels or co-located color components.

Figure 12:
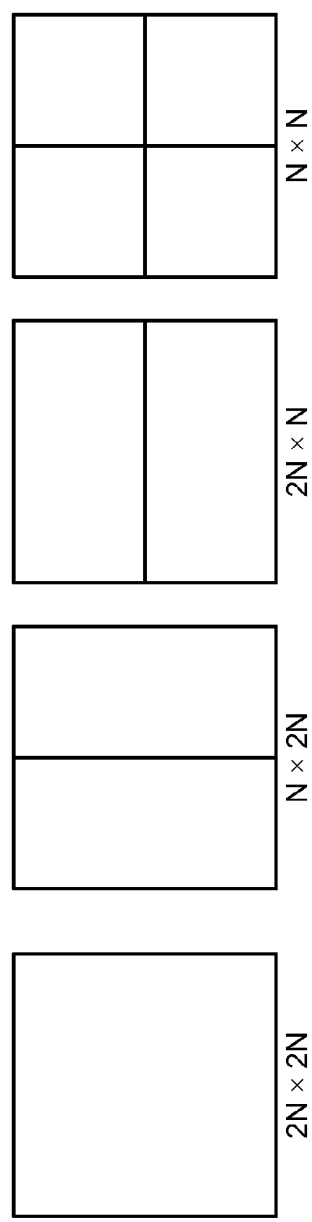
FIG. 12 illustrates an embodiment of prediction unit (PU) modes.

FIG. 12 illustrates an embodiment 1200 of prediction unit (PU) modes. FIG. 12 particularly shows the PU partition modes respectively for a CU having size of 2N×2N. The N×N PU is different from other PU modes, and it only exists with respect to the SCU, or the smallest CU.

In accordance with the currently developing HEVC standard, there are different respective slice types employed, namely, I slice(s), P slice(s), and B slice(s). Generally speaking, I frames operate such that processing, such as in accordance with prediction, is only with respect to that particular frame (e.g., and I frame only performs prediction with respect to self).

P slices operate by using only a single reference list rather than to respective reference lists. Generally speaking, with respect to P slices, prediction, such as in accordance with motion compensation, is performed in accordance with only one direction or unidirectional with respect to the frame sequence. Such prediction in accordance with P slices may be in either direction but only one direction is employed at a given time. Also, prediction accordance with P slices is performed with respect to only one frame at a time, again, in either direction of the frame sequence.

Generally speaking, with respect to B slices, prediction may be performed in accordance with both directions along the frame sequence. For example, prediction, such as in accordance of motion compensation, can be employed in both directions of the frame sequence simultaneously such that information from at least two respective other frames, besides the current frame, may be used in accordance with such motion compensation. For example, consider a current frame 2 interposed between a preceding frame 1 and a following frame 3: the preceding frame 1 may be viewed as being in the past, whereas the following frame 3 may be viewed as being in the future or before the current frame 2 (e.g., with respect to the frame sequence). Information may be taken from either that preceding frame 1 and/or the following frame 3 for processing the current frame 2. Also, certain interpolated information or blended information may be realized from those two other respective frames in accordance with processing the current frame 2 (e.g., information from the preceding frame 1 may be interpolated or blended with information from the following frame 3). Also, with respect to B slices, B slices may employ to respective reference lists. In accordance with operation using B slices, CU prediction mode in PU partition mode are encoded jointly by using a single syntax element (e.g., such as shown with respect to FIG. 15). The binarization employed as a function of whether or not the current CU is the smallest CU, SCU, or not. For example, if the smallest CU, or SCU, is not employed, then the binarization and may be employed using the modified binary tree described below with respect to FIG. 13.

With respect to the PU mode being employed, that information is signaled to a decoder so that it may appropriately know how a signal block has been partitioned and to perform appropriate processing of a video signal encoded in accordance with that particular PU mode. For example, depending upon the particular PU mode employed in accordance with encoding of a video signal, that information is provided to a decoder so that the decoder may appropriately process and decode the received video signal.

Figure 13:
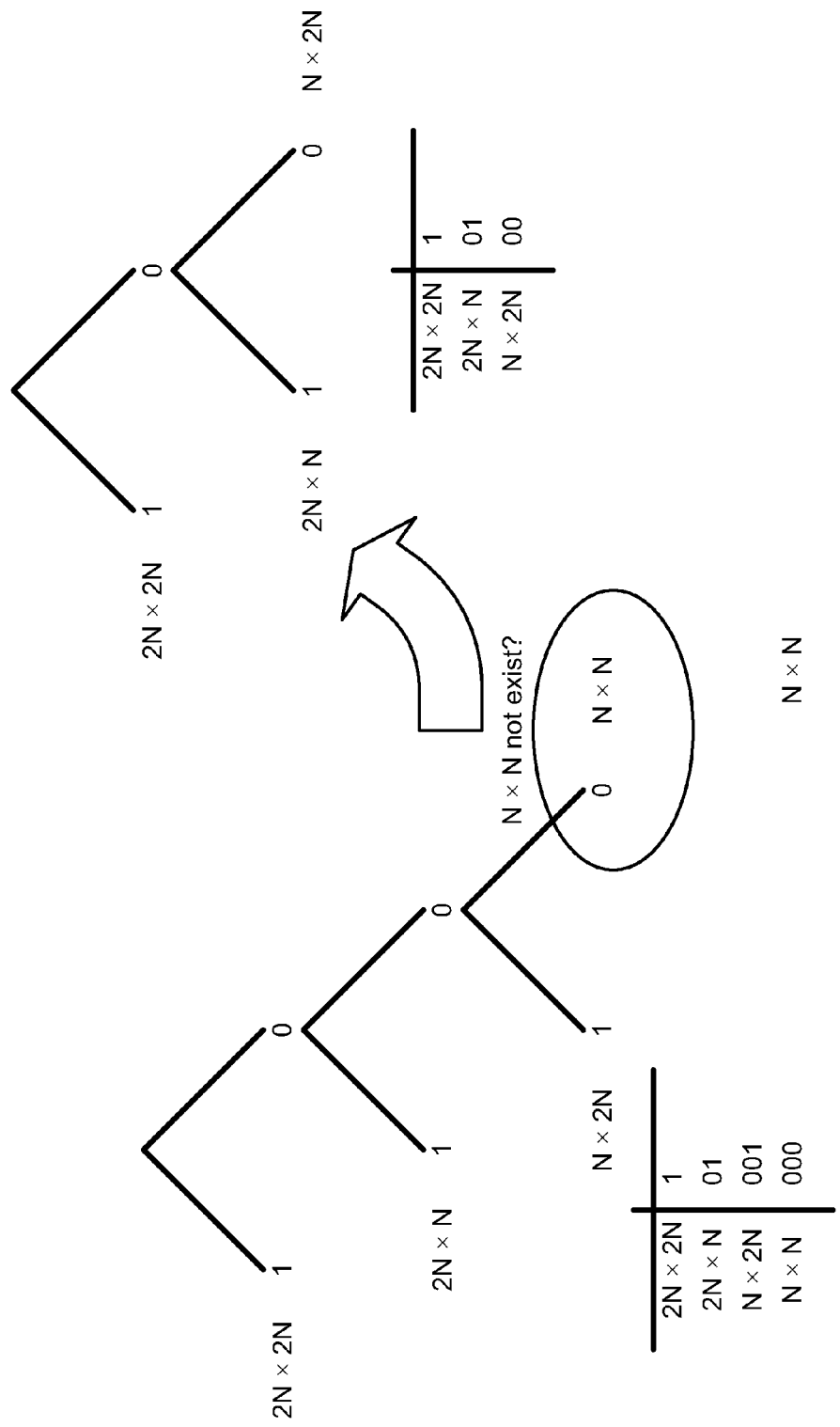
FIG. 13 illustrates an embodiment of a binary tree, including a modification thereof, employed for P slice encoding in one implementation and for both P and B slice encoding in another implementation.

FIG. 13 illustrates an embodiment 1300 of a binary tree, including a modification thereof, employed for P slice encoding in one implementation and for both P and B slice encoding in another implementation. As can be seen with respect to this diagram, a binary tree representing that binarization and of PU partition symbols is illustrated. For example, a partition corresponding to 2N×2N uses a codeword of the single digit, namely, 1. A partition corresponding to 2N×N uses a codeword of two respective digits, namely, 01. A partition corresponding to 2N×N uses a codeword of three respective digits, namely, 001, and a partition corresponding to N×N uses a codeword of three respective digits, namely, 000. It is noted that such encoding may be viewed as being implemented in accordance with Huffman coding, such that those values having correspondingly lower probability are provided relatively longer codewords, while those values having correspondingly higher probability are provided relatively shorter codewords. As may be understood, a system operating in accordance with such Huffman coding may provide for efficiency in terms of employing relatively shorter codewords for those values occurring more frequently and with greater predominance.

In certain implementations, the partition corresponding to N×N may not be specifically implemented, and as such, the codebook associated with representing Ms. binary tree may be modified as including only three respective entries. For example, in such a modified binary tree, a partition corresponding to 2N×2N would use a codeword of the single digit, namely, 1. Also, a partition corresponding to 2N×N would use a codeword of two respective digits, namely, 01. A partition corresponding to 2N×N would use a codeword of two respective digits, 00. As may be seen, by employing such a modified binary tree, a more efficiently implemented Huffman codebook may be realized. Again, as described also above, with respect to B slices, B slices may employ to respective reference lists. In accordance with operation using B slices, CU prediction mode in PU partition mode are encoded jointly by using a single syntax element (e.g., such as shown with respect to FIG. 11). The binarization employed as a function of whether or not the current CU is the smallest CU, SCU, or not. For example, if the smallest CU, or SCU, is not employed, then the binarization and may be employed using the modified binary tree described with respect to FIG. 13.

In an alternative embodiment, the binary tree as pictorially illustrated with respect to FIG. 13 is employed for both B slices and P slices. That is to say, the very same binary tree is employed for both B slices and P slices in such an implementation. As may be understood with respect to such an embodiment, a very efficient implementation may be achieved by using the very same binary tree for both B slices and P slices, in that, only a singular codebook may be employed for both processing of the B slices and P slices. In other words, B slice encoding and P slice encoding may both be performed using the binary tree as pictorially illustrated with respect to FIG. 13 (e.g., the same binary tree is employed for both B slices and P slices) in certain embodiments. Stated another way, the binary tree of FIG. 13, which may be viewed as being intended primarily for use in P slice encoding in one embodiment may, in an alternative embodiment, be employed for both B slice encoding and P slice encoding.

In such an embodiment, separate respective syntax elements may be employed for the CU prediction mode (whether performing inter-prediction or intra-prediction) and the PU partition mode. For example, a first syntax element may be employed for indicating intra-prediction processing or inter-prediction processing, and a second syntax element may be employed for indicating CU partition shape (e.g., indicating how to perform CU splitting and partitioning).

Figure 14:
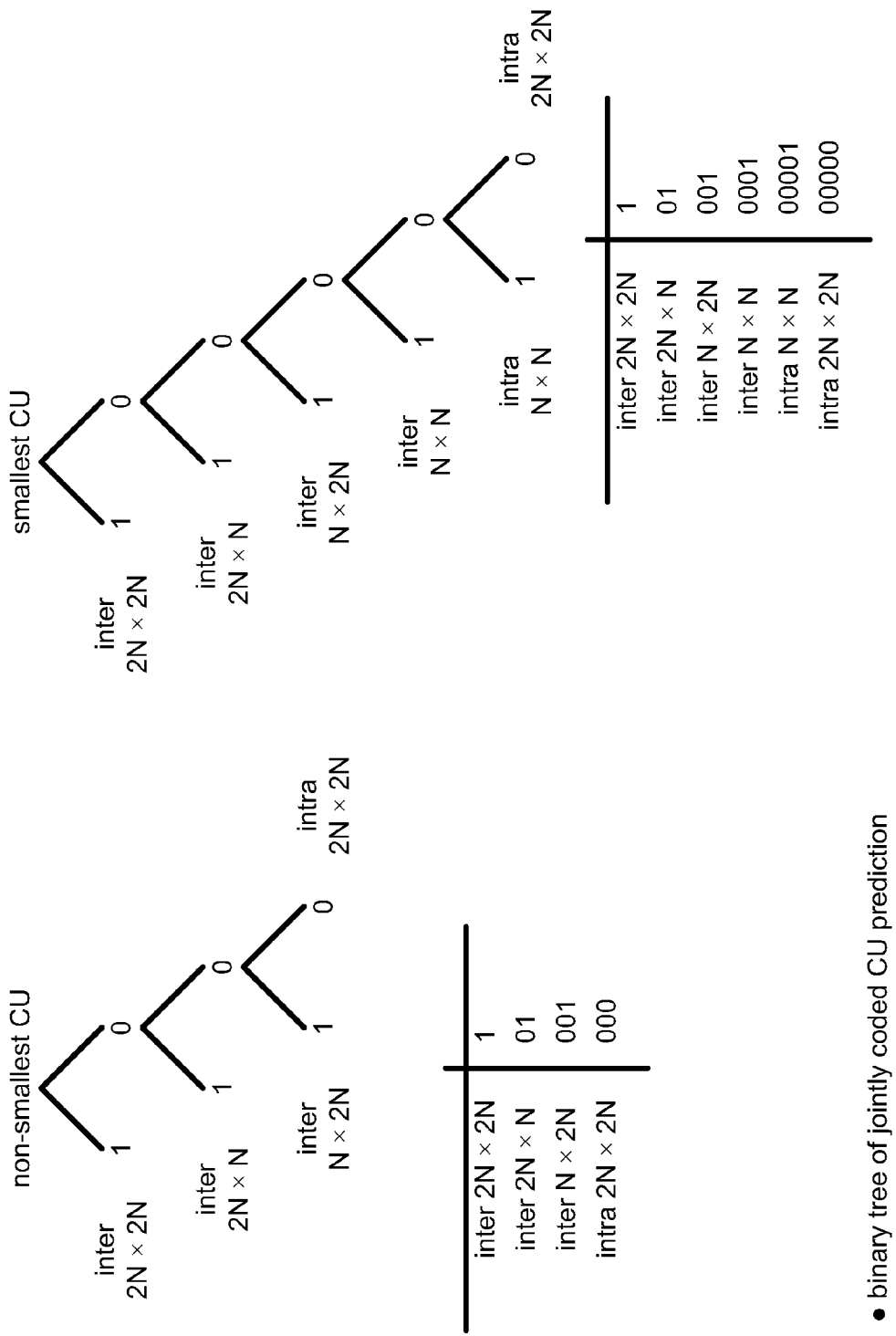
FIG. 14 illustrates an embodiment of a binary tree as may be employed for B slice encoding in one implementation and for both P and B slice encoding in another implementation.

FIG. 14 illustrates an embodiment 1400 of a binary tree as may be employed for B slice encoding in one implementation and for both P and B slice encoding in another implementation. As also described above, with respect to B slices, B slices may employ to respective reference lists. In accordance with operation using B slices, CU prediction mode in PU partition mode are encoded jointly by using a single syntax element (e.g., as shown within FIG. 14).

Figure 15:
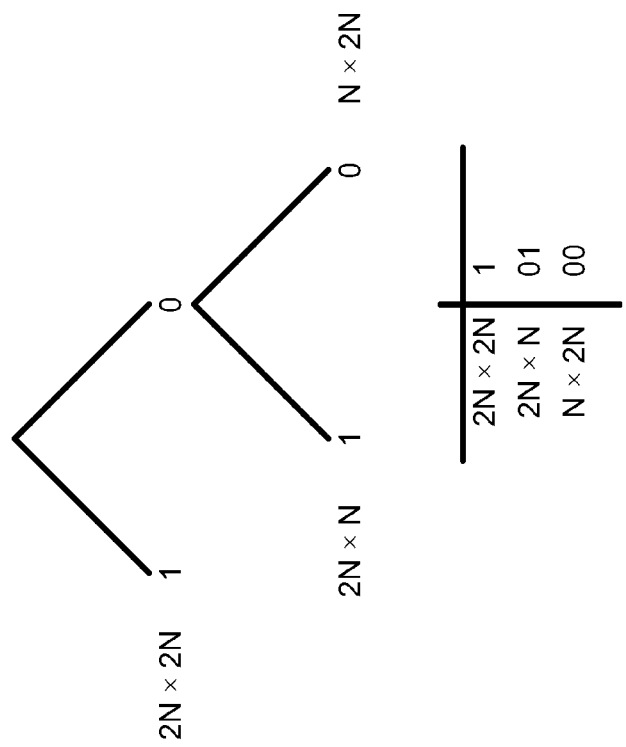
FIG. 15 illustrates an embodiment of a binary tree as may be employed for P slice encoding in conjunction with B slice encoding as performed in accordance with FIG. 12.

In one embodiment, the binary tree as pictorially illustrated with respect to FIG. 14 is employed for B slices, and the modified binary tree pictorially illustrated in the right-hand portion of FIG. 13 as well as in FIG. 15 is employed for P slices. As may be understood, within such an embodiment, by utilizing the modified binary tree (e.g., right-hand portion of FIG. 13 and in FIG. 15) being a relatively more efficiently implemented binary tree when compared to the binary tree of PU partitions as illustrated on the left-hand side of FIG. 13, a more efficiently implemented video coding may be achieved with relatively less overhead. As may be understood, with respect to this embodiment, two different and respective codebooks are employed respectively for B slices (e.g., right-hand portion of FIG. 13 and in FIG. 15) and P slices (e.g., FIG. 14).

In an alternative embodiment, the binary tree as pictorially illustrated with respect to FIG. 14 is employed for both B slices and P slices. That is to say, the very same binary tree is employed for both B slices and P slices in such an implementation. As may be understood with respect to such an embodiment, a very efficient implementation may be achieved by using the very same binary tree for both B slices and P slices, in that, only a singular codebook may be employed for both processing of the B slices and P slices. In other words, B slice encoding and P slice encoding may both be performed using the binary tree as pictorially illustrated with respect to FIG. 14 (e.g., the same binary tree is employed for both B slices and P slices) in certain embodiments. Stated another way, the binary tree of FIG. 14, which may be viewed as being intended primarily for use in B slice encoding in one embodiment may, in an alternative embodiment, be employed for both B slice encoding and P slice encoding.

FIG. 15 illustrates an embodiment 1500 of a binary tree as may be employed for P slice encoding in conjunction with B slice encoding as performed in accordance with FIG. 9. For ease of illustration to the reader, the modified binary tree as depicted in the right-hand portion of FIG. 13 is again pictorially illustrated with respect to this FIG. 15. Such a modified binary tree may be employed with respect to an embodiment that uses two different and respective codebooks are employed respectively for B slices (e.g., right-hand portion of FIG. 13 and in FIG. 15) and P slices (e.g., FIG. 14).

As may be understood with respect to the various embodiments and/or diagrams depicted herein, since the partition corresponding to N×N is allowed only for the smallest CU, or SCU's, that respective partition is not needed for those particular CU's at the root level and at the intermediate levels, respectively. With respect to P slices, the codeword assignment (or binary tree architecture/design) employed for that particular partition corresponding to N×N and the partition sizes that fall into that same branch as N×N (e.g., as may be seen with respect to the partition corresponding to N×2N, within FIG. 13) should be level dependent. If the current CU is not specifically the smallest CU, or SCU, then the modified binary tree as pictorially illustrated in the right-hand portion of FIG. 13 and also FIG. 15 should appropriately and effectively come up with the codewords of the different respective PU partitions. Therefore, the binary tree pictorially illustrated on the left-hand side of FIG. 13 need necessarily be used for the smallest CU, or SCU, in P slices only. That is to say, for other processing not specifically operating on P slices, the binary tree pictorially illustrated on the left-hand side of FIG. 13 may be efficiently reduced and modified thereby generating the modified binary tree as pictorially are illustrated in the right-hand portion of FIG. 13 and also FIG. 15.

Also, as also mentioned above, in accordance with the currently developing HEVC standard, both B slices and P slices respectively used different respective codewords for the different PU modes. In accordance with operation on P slices, the CU prediction mode (whether performing inter-prediction or intra-prediction) and the PU partition mode are encoded separate syntax elements. However, in accordance with operation on B slices, the CU prediction mode and the PU partition mode are encoded jointly by using a single syntax element. In certain situations, this disparate processing, depending upon whether P slices or be slices are being operated on, can create an extra burden for syntax parsing. As such, is also described above, one possible embodiment may be implemented using the binary tree, as pictorially illustrated with respect to FIG. 14, to be used for both B slices and P slices. That is to say, the very same binary tree is employed for both B slices and P slices in such an implementation. As may be understood with respect to such an embodiment, a very efficient implementation may be achieved by using the very same binary tree for both B slices and P slices, in that, only a singular codebook may be employed for both processing of the slices and P slices. For example, such an embodiment but operate by using the very same binary tree to unify processing of both B slices and P slices in this particular case and also to use the same approach with respect to signal CU prediction mode and PU partition mode. One possible embodiment may be implemented such that the CU prediction mode (whether performing inter-prediction or intra-prediction) and the PU partition mode are respectively encoded in separate syntax elements for both P slices and B slices. Another possible embodiment may be implemented such that the CU prediction mode (whether performing inter-prediction or intra-prediction) and the PU partition mode are jointly encoded in a single syntax element for both P slices and B slices.

As may be understood with respect to the various embodiments and/or diagrams herein, a variety of different implementations may be employed as may be desired within a particular application. In some instances, a unification of the processing for both P slices and B slices is effectuated using the common binary tree as pictorially illustrated with respect to FIG. 14. In other instances, when two separately implemented and different respective binary trees and codebooks are employed respectively for B slices and P slices, and particularly when the smallest CU, or SCU, is not employed (e.g., the current CU is not the SCU), then a modified binary tree such as pictorially illustrated with respect to the right-hand side of FIG. 13 and in FIG. 15 may be employed for P slices while the binary tree as pictorially illustrated with respect to FIG. 14 may be employed for B slices.

FIG. 16A, FIG. 16B, FIG. 17A, and FIG. 17B, illustrate various embodiments of methods performed in accordance with video coding (e.g., within one or more communication devices).

Figure 16B:
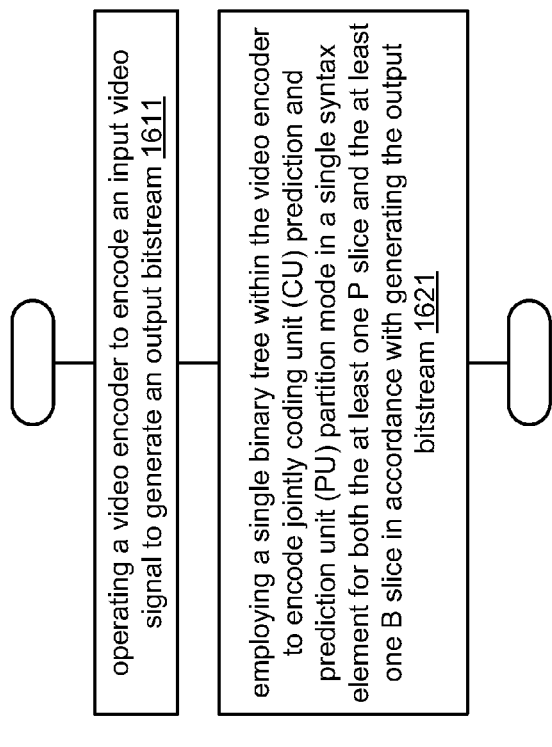
FIG. 16A, FIG. 16B, FIG. 17A, and FIG. 17B, illustrate various embodiments of methods performed in accordance with video coding (e.g., within one or more communication devices).
Figure 16A:
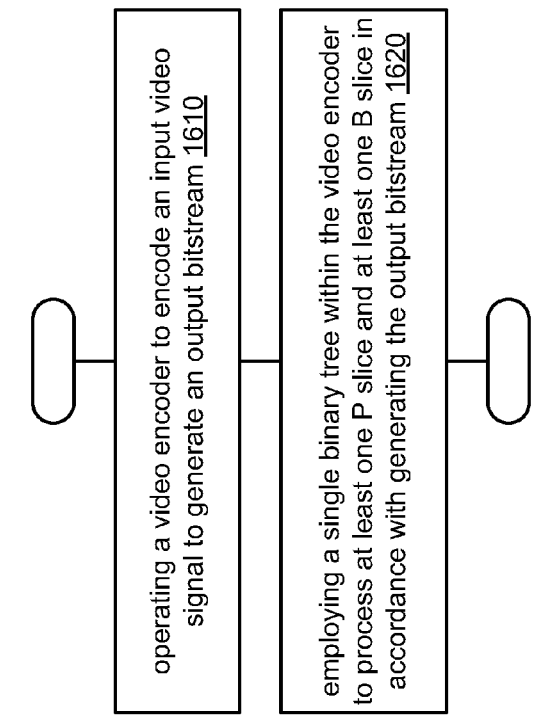

Referring to method 1600 of FIG. 16A, the method 1600 begins by operating a video encoder to encode an input video signal to generate an output bitstream, as shown in a block 1610. The method 1600 continues by employing a single binary tree within the video encoder to process at least one P slice and at least one B slice in accordance with generating the output bitstream, as shown in a block 1620.

Referring to method 1601 of FIG. 16B, the method 1601 begins by operating a video encoder to encode an input video signal to generate an output bitstream, as shown in a block 1611.

The method 1601 then operates by employing a single binary tree within the video encoder to encode jointly coding unit (CU) prediction and prediction unit (PU) partition mode in a single syntax element for both the at least one P slice and the at least one B slice in accordance with generating the output bitstream, as shown in a block 1621.

Figure 17B:
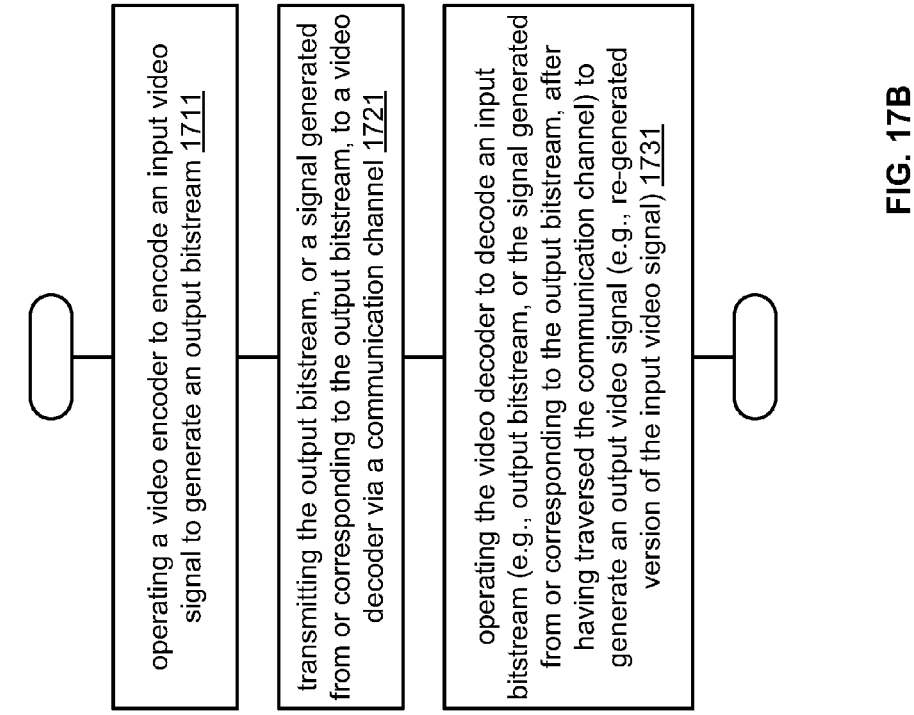
Figure 17A:
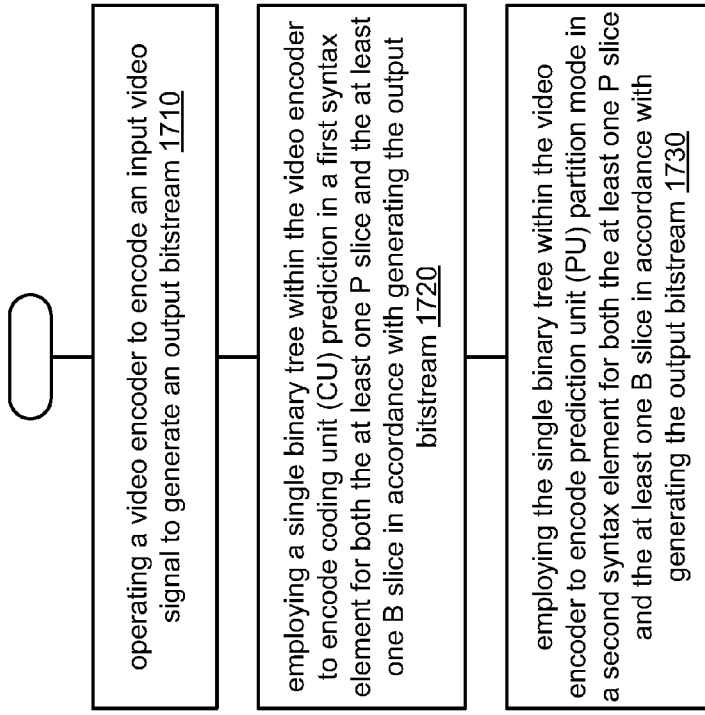

Referring to method 1700 of FIG. 17A, the method 1700 begins by operating a video encoder to encode an input video signal to generate an output bitstream, as shown in a block 1710. The method 1700 continues by employing a single binary tree within the video encoder to encode coding unit (CU) prediction in a first syntax element for both the at least one P slice and the at least one B slice in accordance with generating the output bitstream, as shown in a block 1720.

The method 1700 then operates by employing the single binary tree within the video encoder to encode prediction unit (PU) partition mode in a second syntax element for both the at least one P slice and the at least one B slice in accordance with generating the output bitstream, as shown in a block 1730. As mentioned elsewhere herein with respect to other embodiments and/or diagrams, separate respective syntax elements may be employed for the CU prediction mode (whether performing inter-prediction or intra-prediction) and the PU partition mode. For example, a first syntax element may be employed for indicating intra-prediction processing or inter-prediction processing, and a second syntax element may be employed for indicating CU partition shape (e.g., indicating how to perform CU splitting and partitioning).

Referring to method 1701 of FIG. 17A, the method 1701 begins by operating a video encoder to encode an input video signal to generate an output bitstream, as shown in a block 1711.

The method 1701 continues by transmitting the output bitstream, or a signal generated from or corresponding to the output bitstream, to a video decoder via a communication channel, as shown in a block 1721. For example, at the transmitter end of the communication channel, within some embodiments, any of a variety of operations (e.g., any desired analog and/or digital operations including filtering, scaling, frequency shifting, frequency conversion, rounding, digital to analog conversion, etc.) may be made with respect to the output bitstream to generate a signal that comports with and is suitable for transmission via a communication channel. That is to say, the output bitstream may undergo any of a number of transmitter front-end processing operations (e.g., such as within an analog front end (AFE)) including modulation, continuous-time signal generation, etc. to generate a signal that actually gets transmitted via the communication channel. In other embodiments, the output bitstream itself, without modification, may in fact be transmitted via the communication channel.

The method 1701 then operates by operating the video decoder to decode an input bitstream (e.g., output bitstream, or the signal generated from or corresponding to the output bitstream, after having traversed the communication channel) to generate an output video signal (e.g., re-generated version of the input video signal), as shown in a block 1731. For example, analogously, at the receiving end of the communication channel, within some embodiments, it is noted that any additional processing may be performed on the received signal (e.g., any desired analog and/or digital operations including filtering, scaling, frequency shifting, frequency conversion, rounding, analog to digital conversion, etc.) to generate the signal (e.g., input bitstream) that undergoes video decoding. That is to say, the actual signal received from the communication channel may undergo any of a number of receiver front-end processing operations (e.g., such as within an analog front end (AFE)) including demodulation, etc. to generate the signal (e.g., input bitstream) that undergoes video decoding. Of course, in certain optional embodiments, when the output bitstream itself, without modification, is in fact be transmitted via the communication channel, no such receiver front-end processing operations may be required.

It is also noted that the various operations and functions as described with respect to various methods herein may be performed within a communication device, such as using a baseband processing module and/or a processing module implemented therein and/or other component(s) therein.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A video processing device comprising:
   a video encoder configured to:
   encode an input video signal to generate an output bitstream;
   employ a single binary tree when processing at least one P slice and at least one B slice to generate the output bitstream, wherein the at least one P slice is used for unidirectional prediction forward or behind in at least one frame sequence, and wherein the at least one B slice is used for bidirectional prediction both forward and behind in the at least one frame sequence;
   employ the single binary tree to encode coding unit (CU) prediction based on a selected CU that is selected from a plurality of CUs when generating a first syntax element for both the at least one P slice and the at least one B slice that undergo entropy encoding to generate the output bitstream, wherein the first syntax element specifies intra-prediction processing or inter-prediction processing for the selected CU; and
   employ the single binary tree to encode prediction unit (PU) partition mode based on the selected CU when generating a second syntax element for both the at least one P slice and the at least one B slice that undergo the entropy encoding to generate to generate the output bitstream, wherein the second syntax element specifies the PU partition mode for the selected CU, wherein the PU partition mode is based on a size N×N PU when the selected CU is a smallest CU (SCU) of the plurality of CUs and is based on a different size PU than the size N×N PU when the selected CU is another CU than the SCU of the plurality of CUs, wherein N is a positive integer.

2. The video processing device of claim 1, wherein the PU partition mode is a size 2N×2N PU, a size N×2N PU, or a size 2N×N PU when the selected CU is the another CU than the SCU of the plurality of CUs.

3. The video processing device of claim 1, wherein the video encoder is further configured to:
perform intra-prediction processing at or during a first time to generate the output bitstream; and
perform inter-prediction processing at or during a second time to generate the output bitstream.

4. The video processing device of claim 1, wherein:
the video processing device is a first communication device; and further comprising:
a second communication device, in communication with the first communication device via at least one communication channel, including:
an input configured to receive the output bitstream; and
a video decoder configured to decode the output bitstream to generate an output video signal corresponding to the input video signal; and wherein:
the second communication device is at least one of computer, a laptop computer, a high definition (HD) television, a standard definition (SD) television, a handheld media unit, a set top box (STB), or a digital video disc (DVD) player.

5. The video processing device of claim 1 further comprising:
a communication device that is operative within at least one of a satellite communication system, a wireless communication system, a wired communication system, a fiber-optic communication system, or a mobile communication system.

6. A video processing device comprising:
a video encoder configured to:
encode an input video signal to generate an output bitstream; and
employ a single binary tree when processing at least one P slice and at least one B slice when generating a first syntax element and a second syntax element that undergo entropy encoding to generate the output bitstream, wherein the at least one P slice is used for unidirectional prediction forward or behind in at least one frame sequence, and wherein the at least one B slice is used for bidirectional prediction both forward and behind in the at least one frame sequence, wherein the first syntax element specifies intra-prediction processing or inter-prediction processing for a selected coding unit (CU) that is selected from a plurality of CUs, wherein the second syntax element specifies a prediction unit (PU) partition mode for the selected CU, wherein the PU partition mode is based on a size N×N PU when the selected CU is a smallest CU (SCU) of the plurality of CUs and is based on a different size PU than the size N×N PU when the selected CU is another CU than the SCU of the plurality of CUs, wherein N is a positive integer.

7. The video processing device of claim 6, wherein the video encoder is further configured to:
employ the single binary tree to encode jointly CU prediction and PU partition mode in a single syntax element for both the at least one P slice and the at least one B slice to generate the output bitstream.

8. The video processing device of claim 6, wherein the video encoder is further configured to:
employ the single binary tree to encode CU prediction based on the selected CU when generating the first syntax element for both the at least one P slice and the at least one B slice to generate the output bitstream; and
employ the single binary tree to encode PU partition mode based on the selected CU when generating the second syntax element for both the at least one P slice and the at least one B slice to generate the output bitstream.

9. The video processing device of claim 6, herein the PU partition mode is a size 2N×2N PU, a size N×2N PU, or a size 2N×N PU when the selected CU is the another CU than the SCU of the plurality of CUs.

10. The video processing device of claim 6, wherein the video encoder is further configured to:
perform intra-prediction processing at or during a first time to generate the output bitstream; and
perform inter-prediction processing at or during a second time to generate the output bitstream.

11. The video processing device of claim 6, wherein:
the video processing device is a first communication device; and further comprising:
a second communication device, in communication with the first communication device via at least one communication channel, including:
an input to receive the output bitstream; and
a video decoder to decode the output bitstream to generate an output video signal corresponding to the input video signal.

12. The video processing device of claim 11, wherein:
the second communication device is at least one of computer, a laptop computer, a high definition (HD) television, a standard definition (SD) television, a handheld media unit, a set top box (STB), or a digital video disc (DVD) player.

13. The video processing device of claim 6 further comprising:
a communication device that is operative within at least one of a satellite communication system, a wireless communication system, a wired communication system, a fiber-optic communication system, or a mobile communication system.

14. A method for operating a video processing device of a communication device, the method comprising:
operating a video encoder of the video processing device to encode an input video signal to generate an output bitstream; and
employing a single binary tree within the video encoder to process at least one P slice and at least one B slice when generating a first syntax element and a second syntax element that undergo entropy encoding to generate the output bitstream, wherein the at least one P slice is used for unidirectional prediction forward or behind in at least one frame sequence, and wherein the at least one B slice is used for bidirectional prediction both forward and behind in the at least one frame sequence, wherein the first syntax element specifies intra-prediction processing or inter-prediction processing for a selected coding unit (CU) that is selected from a plurality of CUs, wherein the second syntax element specifies a prediction unit (PU) partition mode for the selected CU, wherein the PU partition mode is based on a size N×N PU when the selected CU is a smallest CU (SCU) of the plurality of CUs and is based on a different size PU than the size N×N PU when the selected CU is another CU than the SCU of the plurality of CUs, wherein N is a positive integer.

15. The method of claim 14 further comprising:
employing the single binary tree within the video encoder to encode jointly CU prediction and PU partition mode in a single syntax element for both the at least one P slice and the at least one B slice when generating the output bitstream.

16. The method of claim 14 further comprising:
employing the single binary tree to encode CU prediction based on the selected CU when generating the first syntax element for both the at least one P slice and the at least one B slice when generating the output bitstream; and
employing the single binary tree to encode PU partition mode based on the selected CU when generating the second syntax element for both the at least one P slice and the at least one B slice when generating the output bitstream.

17. The method of claim 14, herein the PU partition mode is a size 2N×2N PU, a size N×2N PU, or a size 2N×N PU when the selected CU is the another CU than the SCU of the plurality of CUs.

18. The method of claim 14 further comprising:
performing intra-prediction processing at or during a first time when generating the output bitstream; and
performing inter-prediction processing at or during a second time when generating the output bitstream.

19. The method of claim 14 further comprising:
operating an additional communication device, in communication with the communication device via at least one communication channel, by:
receiving the output bitstream; and
operating a video decoder to decode the output bitstream to generate an output video signal corresponding to the input video signal, wherein the additional communication device is at least one of computer, a laptop computer, a high definition (HD) television, a standard definition (SD) television, a handheld media unit, a set top box (STB), or a digital video disc (DVD) player.

20. The method of claim 14, wherein the communication device is operative within at least one of a satellite communication system, a wireless communication system, a wired communication system, a fiber-optic communication system, or a mobile communication system.

* * * * *